United States Patent

Updyke et al.

[15] 3,670,092

[45] June 13, 1972

[54] HERMETICALLY SEALED ELECTRICAL FITTING

[72] Inventors: Kenneth W. Updyke, Peoria; William J. Grebner, Metamora, both of Ill.

[73] Assignee: Caterpillar Tractor Co., Peoria, Ill.

[22] Filed: Sept. 4, 1970

[21] Appl. No.: 69,704

[52] U.S. Cl............................174/152 R, 174/18.153 R, 177/208
[51] Int. Cl.......................................................H01b 17/26
[58] Field of Search....................174/18, 50.56, 52 S, 152 R, 174/152 G, 151, 153 R, 153 G; 277/207–210; 4/295; 220/24.5; 215/54, 53, 52; 138/89

[56] References Cited

UNITED STATES PATENTS 324,492 8/1885 Schwab....................................4/295

3,018,322 1/1962 Goellner................................174/151

FOREIGN PATENTS OR APPLICATIONS 645,439 7/1962 Canada..............................174/153 R Primary Examiner—Darrell L. Clay
Attorney—Fryer, Tjensvold, Feix, Phillips & Lempio

[57] ABSTRACT

A hermetically sealed, insulated fitting for providing electrical continuity across a wall of an internally pressurized housing, an opening in the wall tapering outwardly toward the housing interior, a threaded flanged electrical element penetrating the opening with a flexible insulating member arranged about the element and being formed with a taper generally mating with the tapered opening the tapered surface being formed with a plurality of stepped ridges, the flanged electrical element being effective to urge the tapered insulating member into sealing engagement with the tapered hole and the element itself.

2 Claims, 2 Drawing Figures

PATENTED JUN 13 1972 3,670,092
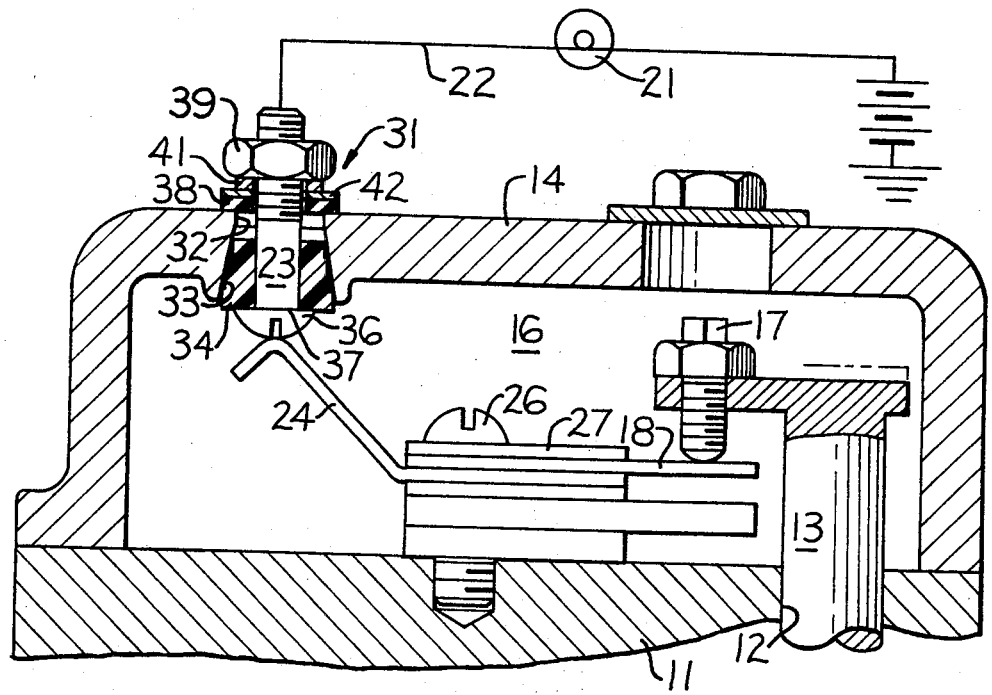
Fig_1_
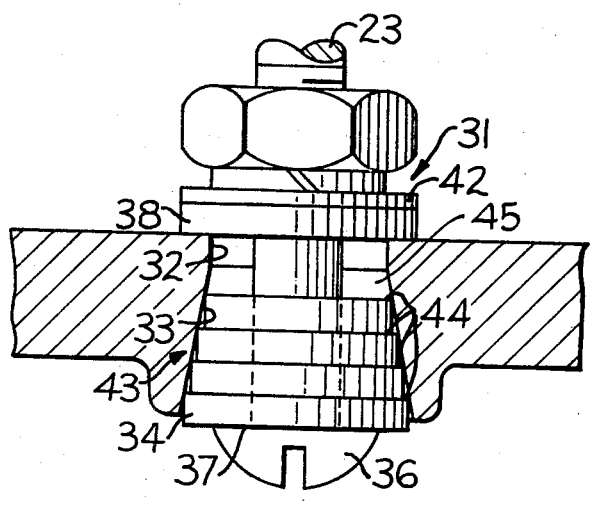
Fig_2_
INVENTORS
KENNETH W. UPDYKE
WILLIAM J. GREBNER
BY
Fryer, Tjensvold, Feix, Phillips & Lempio
ATTORNEYS

HERMETICALLY SEALED ELECTRICAL FITTING

The present invention relates to a hermetically sealed fitting for a pressurized housing. The seal is provided by a flexible member which is tapered to generally mate with a tapered opening in the housing wall. A rigid element penetrating the opening and surrounded by the tapered member is employed to urge the member into sealing engagement with the housing wall.

Preferably, the tapered member has a plurality of stepped annular ridges formed on its tapered surface for entering into intimate sealing engagement with the tapered opening. This feature insures a more positive seal and allows a greater tolerance for the tapered opening so that the insulating member and element may be arranged for example in an "as cast" passage without the need for machining the tapered surface of the opening.

Another preferred feature of the invention is the use of a flanged element which may be employed to urge the tapered member into the tapered opening. The flexible material of the tapered member is thereby forced into sealing engagement with the tapered surface of the opening and with the element itself to assure a good hermetic seal between the element and the housing wall by longitudinal deformation of the stepped ridges.

A preferred embodiment contemplates the fitting as providing electrical continuity across the housing wall, the tapered member serving both to seal and insulate the element from the housing wall.

Other objects and advantages of the present invention are made apparent in the following description having reference to the accompanying drawing.

In the drawing:

FIG. 1 is a sectioned view of an internally pressurized housing with a hermetically sealed and insulated electrical fitting constructed according to the present invention for providing electrical continuity across a wall of the housing; and FIG. 2 is an enlarged, fragmentary view of the fitting of FIG. 1.

A preferred environment for the present invention is illustrated in FIG. 1 and includes a portion of a hydraulic engine governor wherein an electrical sensor switch is employed to determine the position of a fuel rack control member for controlling the amount of fuel delivered to the associated engine combustion chamber by its fuel injection pump (not shown).

A portion of the hydraulic governor housing is illustrated at 11 in FIG. 1, forming a bore 12 for slidably receiving a fuel pump rack control member 13. A formed cover 14 is secured to the governor housing 11 to provide an enclosed chamber 16. During operation, the chamber 16 may be subjected to fluid pressures as great as 35 to 45 psi.

An adjustable screw 17 limits downward motion of the member 13 upon engagement with a rack stop member 18. When the screw 17 is in contact with the stop 18, the control member 13 is positioned for maximum fuel delivery by the governor. Since it is otherwise difficult to determine when the control member 13 is positioned for maximum fuel delivery, an external signal means such as the lamp 21 is provided to indicate the occurrence of such a condition. A circuit 22 for the lamp 21 is electrically coupled with the stop member 18 by means of an electrical element or bolt 23 which penetrates the wall or cover 14 of the chamber and a spring-like member 24. The stop member 18 and the spring 24 are secured to the governor housing 11 by a screw 26 with insulating members 27 and 28 being arranged on opposite sides of the two members to insulate them from the governor housing 11.

The present invention relates particularly to a fitting 31 for hermetically sealing and insulating the bolt 23 relative to an opening 32 in the cover 14.

Referring also to FIG. 2, a portion 33 of the opening 32 tapers outwardly toward the interior or chamber 16 of the housing. A cylindrical insulating member 34, formed for example from a flexible plastic material such as nylon, is arranged within the tapered portion 33 of the opening about the shaft of the bolt 23. The bolt 23 has a flanged head 36 for acting against a surface 37 on the insulating member 34 facing toward the chamber 16. An insulating washer 38 is arranged about the shaft of the bolt 23 outside the wall 14 and spaced from the insulating member 34. A nut 39 threadedly engages the bolt 23 with a lock washer 41 and a rigid metal washer 42 being arranged between the nut and the insulating washer 38. As the nut 39 is tightened onto the bolt 23, the bolt head 36 draws the flexible insulating member 34 into the tapered opening 33. The flexible member 34 tends to be compressed both against the tapered opening 33 and the shaft of the bolt 23 to provide a tight hermetic seal across the opening in the wall 14.

To further improve sealing engagement of the flexible member 34 with the tapered opening 33, the member 34 includes a plurality of stepped ridges 44 forming a generally tapered surface 43 generally mating with the tapered opening 33. As the flexible insulating member 34 is compressed within the opening by the screw, each of the ridges 44 is urged into intimate engagement with the tapered opening surface 33 by longitudinal deformation to better assure a seal therebetween. Even after the seal is established, the space 45 between the insulating member 34 and the insulating washer 38 still exists.

A hermetically sealed fitting of the type described above has been found particularly effective for closing an opening in an internally pressured housing of the type described herein. As also disclosed within the above description, the present hermetically sealed and insulated fitting is particularly adapted for providing electrical continuity across a wall of such an internally pressurized housing.

What is claimed is:

1. A hermetically sealed, insulated fitting providing electrical continuity across a wall of an internally pressurized housing, comprising:
    an opening formed by the wall, a portion of the opening tapering outwardly toward the housing interior,
    a threaded electrical element penetrating the opening and having a flanged end,
    a tapered, flexible insulating member arranged about the element and having a tapered surface generally mating with the tapered opening, the tapered surface being formed with a plurality of stepped ridges intimately engaging the tapered opening, the electrical element flange overlapping the insulating element,
    an insulating washer arranged about the electrical element on the exterior of said housing and spaced from said insulating member, and
    a nut threadedly engaging the element and acting on the washer urging the electrical element flange against the insulating member and compressing the insulating member into the tapered opening while maintaining a space between said insulating member and said insulating washer.

2. The fitting of claim 1 wherein a rigid washer is disposed between the nut and the insulating washer, a lock washer is disposed between the nut and the rigid washer.

* * * * *